March 28, 1950

A. L. LOUCKS 2,501,869

VALVE

Filed May 23, 1946

INVENTOR
A.L. LOUCKS
BY
ATTORNEY

March 28, 1950 A. L. LOUCKS 2,501,869
VALVE

Filed May 23, 1946 2 Sheets-Sheet 2

INVENTOR
A.L. LOUCKS
BY
ATTORNEY

Patented Mar. 28, 1950

2,501,869

UNITED STATES PATENT OFFICE 2,501,869

VALVE

Alton L. Loucks, Baltimore, Md., assignor to Western Electric Company, Incorporated, New York, N. Y., a corporation of New York Application May 23, 1946, Serial No. 671,837

4 Claims. (Cl. 251—51)

This invention relates to valves, and more particularly to valves having quickly openable orifices.

In applying viscous thermoplastic cement which occasionally has lumps therein to articles, the cement is sometimes passed through a relatively large supply line to a discharge valve, which has a relatively small orifice to limit the quantity of the cement applied to the article. Sometimes the lumps in the cement, which are too large to pass the orifice, partially or completely clog the orifice, and thereby interfere with the application of the cement to the articles. In the past, no means have been provided to completely clear the orifice of such cement in a very short period of time in order to prevent interruption of the application of the cement to articles.

An object of the invention is to provide new and improved valves.

A further object of the invention is to provide valves which have adjustable and quickly openable orifices so that the orifices can be opened quickly to prevent clogging of the valves without interrupting the operations of machines with which the valves are associated.

A valve forming one specific embodiment of the invention includes a valve body having a triangular orifice therein with the apex of the orifice pointed in a predetermined direction, which is fastened adjustably to the discharge end of a supply line through which viscous and sometimes lumpy thermoplastic cement is passed. A closure member is slidably mounted on the valve body and has a triangular orifice therein, and the apex thereof points in a direction opposite to that of the apex of the orifice in the valve body. The closure member normally is urged by a compression spring against an adjustable stop to a position in which the orifice therein is only partially in communication with the orifice in the valve body. When lumps in the thermoplastic cement prevent flow of the cement through the open portion of the orifice in the closure member, the closure member may be moved rapidly to a position in which the orifice is aligned with the orifice in the valve body so that clearance is provided for the lumps to pass completely through the valve. After this occurs, the closure member is released and the compression spring snaps its back against the adjustable stop, and again restricts the opening.

A complete understanding of the invention may be obtained from the following detailed description of a valve forming a specific embodiment thereof, when read in conjunction with the appended drawings, in which.

Figure 1:
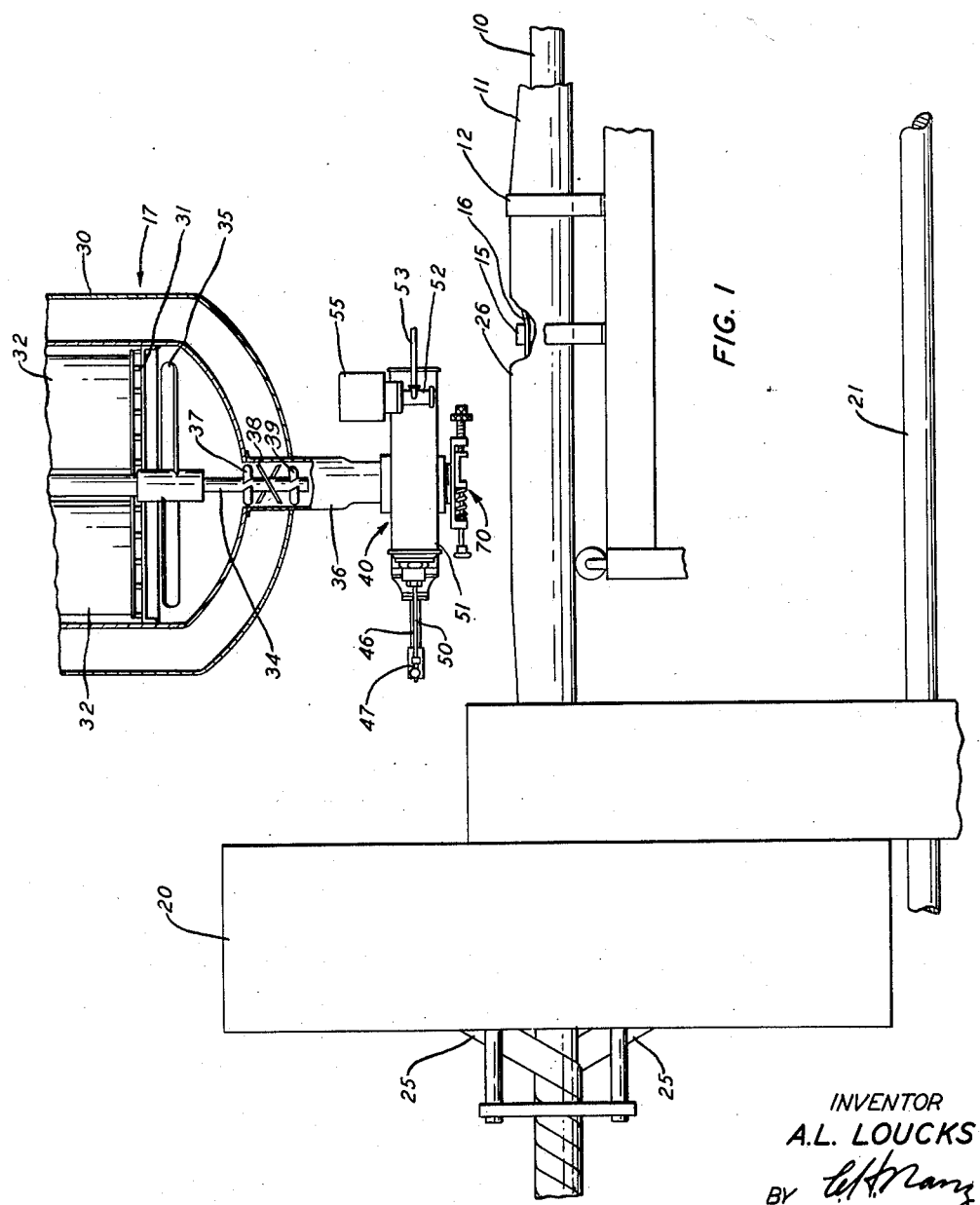
Fig. 1 is a side elevation of an apparatus including a valve forming one specific embodiment of the invention.

Referring now in detail to the drawing, a cement-covered cable 19 and a thermoplastic tape 11 are advanced continuously in the direction of the arrow in Fig. 1 through a U-shaped former 12 and a former 15, which presses an edge 16 of the tape against the cable. The cable and tape then are carried past a thermoplastic cement applicator 17 and through a serving head 20 of a well-known type, which is driven by a line shaft 21 driven by a suitable source of power, such as an electric motor (not shown). The formers 12 and 15, the serving head, the line shaft and the motor are disclosed in detail in my copending application Serial No. 671,835, filed May 23, 1946, now Patent Number 2,494,050, granted January 10, 1950. The serving head 20 applies fabric tapes 25—25 to wrap an edge 26 of the tape 11 over the edge 16 thereof. The cement applicator 17 applies a stream of thermoplastic cement to the portion of the thermoplastic tape 11 adjacent to the edge 16 thereof as the tape is advanced therepast, and the fabric tapes 25—25 press the edge 26 of the tape 11 tightly against the portion of the edge 16 thereof having cement thereon, whereby the edge 26 of the tape 11 is sealed to the edge 16 thereof.

Figure 2:
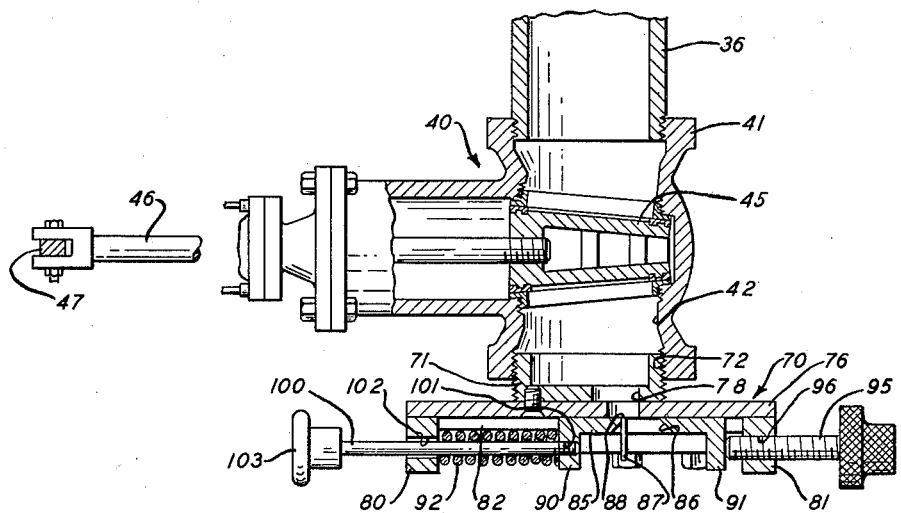
Fig. 2 is a fragmentary, vertical section of the valve.
Figure 3:
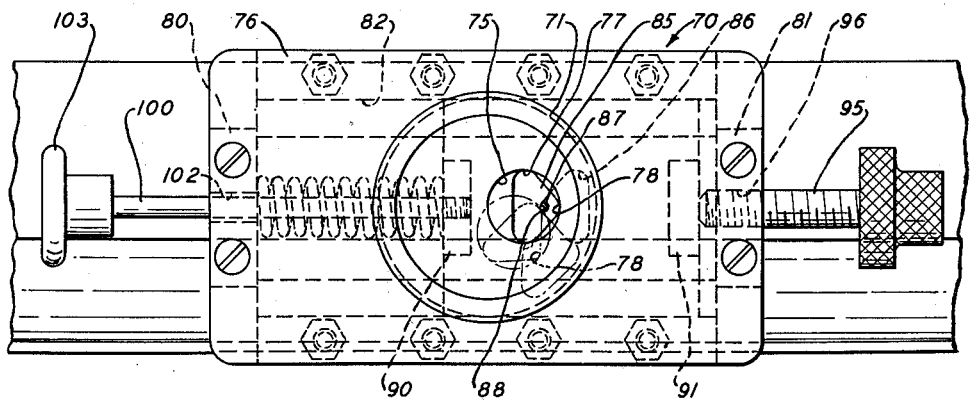
Fig. 3 is a fragmentary, top plan view of the valve.

The applicator 17 includes a steam-jacketed melting kettle 30 having a grating 31 therein, on which grating open end cans 32—32 containing the thermoplastic cement are placed. The steam-jacketed melting kettle heats the cans 32—32 and the cement so that the cement melts and flows out of the cans through the grating into the bottom of the kettle 30. A shaft 34 having a propeller 35 thereon rotates the propeller 35, which agitates the cement in the melting kettle, whereby melting of the cement is accelerated. The container 30 includes a discharge conduit 36 into which the cement flows, and propellers 37, 38 and 39 mounted on the shaft 34 urge the cement gently through the discharge conduit 36 to a gate valve 40 (Fig. 2). The propeller 38 tends to urge the cement upwardly, as viewed in Fig. 1, and the propellers 37 and 39 urge the cement downwardly. The total effect of the three propellers 37, 38 and 39 is to urge the cement downwardly, but the propeller 38 by its upward-urging action agitates the cement and prevents it from congealing in the discharge conduit 36.

The gate valve 40 includes a valve body 41 having a substantially straight passage 42 therein, and a valve wedge 45 mounted for movement transverse to the axis of the passage 42 in the valve body 41. A stem 46 serves to connect the wedge 45 to a lever 47 of the second class, which is connected near one end thereof to a piston rod 50 (Fig. 1) of a piston (not shown) positioned in a cylinder 51. A four-way valve 52, having a supply line 53 connected to a supply of air under pressure, serves to control the passage of air under pressure to the cylinder 51. A solenoid 55, which controls the four-way valve 52, is actuated by a control circuit disclosed in the above-mentioned copending application Serial No. 671,835, filed May 23, 1946, now Patent Number 2,494,050, granted January 10, 1950, the operation of which it is not necessary to disclose herein. When the winding of the solenoid 55 is energized, it actuates the four-way valve 52 to cause the piston rod 50 to be moved to the left, as viewed in Fig. 1, whereby the lever 47 and the stem 46 move the wedge 45 (Fig. 2) to open the passage 42 in the valve body 41 so that the cement from the discharge conduit 36 has a free passage through the passage 42 in the valve body 41.

When the above-mentioned control circuit (not shown) is actuated in one manner, the line shaft 21 is not driven and the shaft and the serving head 20 coast to a stop. A capstan (not shown), which advances the tape 11 and the cable 10 to the left, as viewed in Fig. 1, is driven by the line shaft 21 and also coasts to a stop. However, the control circuit prevents deenergization of the solenoid 55 until the line shaft stops completely, which controlling action is described in detail in the above-mentioned copending application. After the line shaft, the capstan and the serving head stop completely so that the tape 11 and the cable 10 are not being advanced through the apparatus, the control circuit de-energizes the winding of the solenoid 55. A spring (not shown) actuates the four-way valve 52 to cause the piston rod 50 to be moved to the right, as viewed in Fig. 1, to move the wedge 45 (Fig. 2) to the position in which it is shown in Fig. 2, in which position the wedge 45 completely closes the passage 42 in the valve body 41 so that the supply of cement to the edge 16 of the tape 11 is shut off.

A flow-control valve 70 includes a threaded boss 71, which is screwed into a threaded portion 72 of the valve body 41 of the gate valve 40, and is provided with a large passage 75 therein. The flow-control valve 70 also includes a plate 76, which has a generally triangular orifice 77 therein having a rounded apex 78 pointed along the longitudinal axis of the plate 76. The plate 76 also has shoulders 80 and 81 projecting downwardly therefrom, as viewed in Fig. 2, and includes a guideway 82 extending longitudinally thereof. A slidable closure plate 85 provided with a triangular orifice 86, which flares outwardly, has a downwardly directed guide rod 87 fastened to a rounded apex 88 of the orifice, which apex is directed oppositely to the apex 78 of the orifice 77. The slidable plate 85 is provided with downwardly directed shoulders 90 and 91, and a compression spring 92 positioned between the shoulder 80 of the plate 76 and the shoulder 90 of the plate 75 urges the slidable plate 85 to a position where the shoulder 91 abuts an adjustable stop screw 95 threaded into a tapped bore 96 in the shoulder 81 of the plate 76. In this position, the slidable plate 85 closes a large portion of the orifice 77 of the plate 76 so that only a small stream of cement flows through the orifices 77 and 86. The cement which does flow through these orifices is prevented from flaring outwardly by the guide rod 87, which guides it in a solid stream toward the edge 16 of the tape 11 (Fig. 1).

The stop screw 95 may be screwed farther through the tapped bore 96 or farther out of the tapped bore 96 to enlarge or lessen, respectively, the size of the open portion of the orifice 77 in the plate 76. The orifice 77 in the plate 76 is located eccentrically with respect to the boss 71, and the orifice 86 in the plate 85 is eccentric with respect to the boss 71. Thus, if the boss 71 is threaded farther into the tapped portion 72 of the gate valve 40, the orifices 77 and 86 are moved laterally with respect to the edge 16 of the tape 11 (Fig. 1) so that the stream of cement may be applied to any desired portion of the tape 11 adjacent to the edge 16 thereof.

If the effective or open portion of the orifice 77 in the plate 76 became partially or completely clogged by lumps in the cement, a rod 100, which is screwed into a tapped bore 101 formed in the shoulder 90 of the plate 85 and passes through a guide bore 102 formed in the shoulder 80 of the plate 76, is pulled manually to the left, as viewed in Fig. 2, by a nob 103 thereon. This moves the orifice 86 in the plate 85 to a position in substantially complete alignment with the orifice 77 in the plate 76 so that the open portion of the orifice 77 is greatly enlarged and the lump or lumps in the cement may flow through the orifice 86 and unclog the flow-control valve 70. The knob 103 then is released and the compression spring 92 snaps the plate 85 back to its normal position so that the regulated flow of the cement through the flow-control valve 70 is continued.

In the operation of the flow-control valve 70, the cement flows through the effective portion of the orifice 86 in the slidable plate 85 and is directed in a stream by the guide rod 87 upon the edge 16 (Fig. 1) of the tape 11. The size of the stream of cement is controlled by the size of the effective portion of the orifice 86, which may be adjusted within very fine limits by the adjustment screw 95. If, during the operation of the flow-control valve 70, a lump or lumps in the cement which cannot pass through the open portion of the orifice 77 in the plate 76 accumulate in the orifice 77 in the plate 76, an operator grasps the knob 103 and pulls the slidable plate 85 to a position to which the orifice 86 therein is substantially aligned with the orifice 77 in the plate 76 and the lump or lumps clogging the orifice 77 flow therethrough. The knob 103 then is released and the compression spring 92 returns the plate 85 to its normal position. This operation consumes only a short period of time and may be very easily effected.

The flow-control valve 70 may be adjusted within very close limits and may be cleared of clogging material merely by pulling the plate 85 to a position in which the orifice 86 therein is aligned with the orifice 77 in the plate 76, and then permitting the plate 85 to be returned after the valve 70 has been unclogged without readjusting the valve 70. The size of the normally open portion of the orifice 86 may be adjusted within very fine limits and very accurately by the adjustment screw 95. The position of the effective orifice may also be adjusted laterally to align it with a cable or other article to which the material flowing through the orifice is applied. The flow control valve 70 is simple in construction and operation but is highly effective both in controlling the flow of the cement and in discharging clogging material therefrom. Obviously, the flow control valve may be used for many other purposes in addition to applying cement to a cable-covering tape.

What is claimed is:

1. A valve for controlling the flow of material through a conduit having a discharge portion, which comprises a valve body mounted for rotative adjustment with respect to the discharge portion of such a conduit, said valve body including a rectangular plate provided with a generally triangular orifice in communication with the conduit and positioned eccentrically with respect thereto, said orifice in the valve body including a rounded apex pointing in a predetermined direction, a closure plate having a generally triangular orifice therein and mounted slidably with respect to the first-mentioned plate, said orifice in the closure plate including a rounded apex directed opposite to the rounded apex of the orifice of the first-mentioned plate, a guide rod carried by the closure plate for guiding the material from the orifice in the closure plate, a pull rod secured to the closure plate for sliding it with respect to the first-mentioned plate, a stop for limiting the movement of the closure plate along the guideway, and means for urging the closure plate against the stop.

2. A valve for controlling the flow of material through a conduit having an internally threaded discharge portion, which comprises a threaded cap having an opening positioned eccentrically with respect to the longitudinal axis thereof for adjustably engaging the threaded discharge portion of the conduit, a rectangular plate provided with a lug on one end having a guide bore therein and a lug on the opposite end having a tapped bore therein and secured rigidly to the cap in a position extending transversely with respect to the longitudinal axis of the cap, said plate also being provided with a generally triangular orifice in communication with the opening in the cap, which orifice has a rounded apex pointing toward the lug of the plate having the tapped bore therein, and a guideway extending between the lugs thereof, a closure plate having a generally triangular outwardly flaring orifice therein and mounted slidably in the guideway of the first-mentioned plate, an apex of the orifice of the closure plate being directed toward the lug of the first-mentioned plate which has the guide bore therein, a guide rod positioned at said apex of the orifice in the closure plate for directing material flowing from that orifice, an adjustment screw threaded into the tapped bore in the lug of the first-mentioned plate for limiting the movement of the closure plate along the guideway, a compression spring for urging the closure plate against the adjustment screw, and a pull rod mounted slidably in the guide bore in the lug of the first-mentioned plate for moving the closure plate along the guideway against the action of the compression spring.

3. A valve for controlling the flow of material through a conduit having a discharge portion, which comprises a valve body mounted for rotative adjustment with respect to the discharge portion of such a conduit, said valve body including a rectangular plate provided with a generally triangular orifice in communication with the conduit and positioned eccentrically with respect thereto, said orifice in the valve body including an apex pointing in a predetermined direction, a closure plate having a generally triangular orifice therein and mounted slidably with respect to the first-mentioned plate, said orifice in the closure plate including an apex directed opposite to said apex of the orifice of the first-mentioned plate, a guide rod carried by the closure plate for guiding the material from the orifice in the closure plate, a pull rod secured to the closure plate for sliding it with respect to the first-mentioned plate, a stop for limiting the movement of the closure plate along the guideway, and means for urging the closure plate against the stop.

4. A valve for controlling the flow of material through a conduit having a discharge portion, which comprises a valve body mounted for rotative adjustment with respect to the discharge portion of such a conduit, said valve body including a rectangular plate provided with a generally triangular orifice in communication with the conduit and positioned eccentrically with respect thereto, said orifice in the valve body including a rounded apex pointing in a predetermined direction, a closure plate having a generally triangular orifice therein and mounted slidably with respect to the first-mentioned plate, said orifice in the closure plate including a rounded apex directed opposite to the rounded apex of the orifice of the first-mentioned plate, and a guide rod carried by the closure plate for guiding the material from the orifice in the closure plate.

ALTON L. LOUCKS.

REFERENCES CITED

The following references are of record in the file of this patent:

UNITED STATES PATENTS

| Number | Name | Date |
|---|---|---|
| 1,160,790 | Vampa | Nov. 16, 1915 |
| 1,297,446 | Collins | Mar. 18, 1919 |
| 1,531,365 | Wigley | Mar. 31, 1925 |
| 1,536,874 | Bates | May 5, 1925 |
| 1,565,485 | Melson | Dec. 15, 1925 |
| 1,567,537 | Mockus | Dec. 29, 1925 |
| 1,593,695 | Hanson | July 27, 1926 |
| 1,892,260 | Wick | Dec. 27, 1932 |
| 1,898,147 | Smith | Feb. 21, 1933 |
| 2,123,354 | Corse | July 12, 1938 |
| 2,218,811 | Chaussabel | Oct. 22, 1940 |
| 2,310,516 | Clark | Feb. 9, 1943 |